(12) United States Patent
Taherzadeh Boroujeni et al.

(10) Patent No.: US 11,722,995 B2
(45) Date of Patent: Aug. 8, 2023

(54) METHODS AND APPARATUS FOR SELECTING TRANSMISSION OF UNSENT DATA RETRANSMISSIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/243,459

(22) Filed: Apr. 28, 2021

(65) Prior Publication Data
US 2021/0352627 A1 Nov. 11, 2021

Related U.S. Application Data

(60) Provisional application No. 63/022,390, filed on May 8, 2020.

(51) Int. Cl.
*H04W 72/02* (2009.01)
*H04L 1/18* (2023.01)
(Continued)

(52) U.S. Cl.
CPC ............ *H04W 72/02* (2013.01); *H04L 1/189* (2013.01); *H04W 24/08* (2013.01); *H04W 72/23* (2023.01)

(58) Field of Classification Search
CPC ...... H04L 1/189; H04W 24/08; H04W 72/02; H04W 72/23
See application file for complete search history.

(56) References Cited

U.S. PATENT DOCUMENTS

2020/0314745 A1\* 10/2020 Yi .......................... H04W 72/23
2020/0322876 A1\* 10/2020 Zhang ................... H04W 72/23
(Continued)

FOREIGN PATENT DOCUMENTS

WO 2019144898 A1 8/2019
WO 2020065615 A2 4/2020

OTHER PUBLICATIONS

Catt: "Solutions for Intra-UE Prioritization and Multiplexing", 3GPP Draft, 3GPP TSG-RAN WG2 Meeting 104, R2-1900156, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051601556, 7 Pages, Retrieved from the Internet: URL: http://WWW.3gpp.org/ftp/tsg%5Fran/WG2%5FRL2/TSGR2%5F105/Docs/R2%2D1900156%2Ezip. [Retrieved on Feb. 15, 2019] Section 2.3.

(Continued)

Primary Examiner — Kent Krueger
(74) Attorney, Agent, or Firm — Arun Swain; Procopio, Cory, Hargreaves & Savitch LLP

(57) ABSTRACT

The present disclosure relates to methods and devices for wireless communication including an apparatus, e.g., a user equipment (UE) and/or base station. In one aspect, the apparatus may determine a selection procedure for uplink transmissions, the selection procedure including information for uplink data retransmissions. The apparatus may also transmit, to a UE, the selection procedure for uplink transmissions. The apparatus may also monitor for at least one uplink transmission from the UE based on the selection procedure for uplink transmissions. In another aspect, the apparatus may receive, from a base station, a selection procedure for uplink transmissions, the selection procedure including information for uplink data retransmissions. The apparatus may also implement the selection procedure for (Continued)

uplink transmissions. The apparatus may also transmit, to the base station, at least one uplink transmission based on the selection procedure for uplink transmissions.

30 Claims, 11 Drawing Sheets

(51) Int. Cl.
*H04W 24/08* (2009.01)
*H04L 1/1867* (2023.01)
*H04W 72/23* (2023.01)

(56) References Cited

U.S. PATENT DOCUMENTS

| | | | |
|---|---|---|---|
| 2020/0337080 A1* | 10/2020 | Xu | H04W 52/247 |
| 2021/0044391 A1* | 2/2021 | Lunttila | H04L 1/1887 |
| 2021/0105812 A1* | 4/2021 | Rastegardoost | H04L 1/08 |
| 2021/0160879 A1* | 5/2021 | Lin | H04L 1/0003 |
| 2022/0014314 A1* | 1/2022 | Wang | H04W 72/1268 |

OTHER PUBLICATIONS

International Search Report and Written Opinion—PCT/US2021/029983—ISA/EPO—dated Jul. 26, 2021.

* cited by examiner

METHODS AND APPARATUS FOR SELECTING TRANSMISSION OF UNSENT DATA RETRANSMISSIONS

CROSS REFERENCE TO RELATED APPLICATION(S)

This application claims the benefit of U.S. Provision Application Ser. No. 63/022,390, entitled "METHODS AND APPARATUS FOR SELECTING TRANSMISSION OF UNSENT DATA RETRANSMISSIONS" and filed on May 8, 2020, which is expressly incorporated by reference herein in its entirety.

BACKGROUND

Technical Field

The present disclosure relates generally to communication systems, and more particularly, to unsent data transmissions in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a selection procedure for uplink transmissions, where the selection procedure may include information for uplink data retransmissions. The apparatus may also implement the selection procedure for uplink transmissions. Moreover, the apparatus may determine that data is unable to be retransmitted via a PUSCH, where the data that is determined unable to be retransmitted via the PUSCH may correspond to unsent PUSCH data retransmissions. The apparatus may also transmit, to the base station, at least one uplink transmission based on the selection procedure for uplink transmissions. The apparatus may also transmit the data that is determined unable to be retransmitted via the PUSCH via a configured grant.

In another aspect of the disclosure, a method, a computer-readable medium, and an apparatus are provided. The apparatus may be a user equipment (UE). The apparatus may determine a selection procedure for uplink transmissions, the selection procedure including information for uplink data retransmissions, where the information for uplink data retransmissions may correspond to specification information. The apparatus may also identify whether the transmission of unsent PUSCH data retransmissions is via a configured grant. The apparatus may also select a configured grant for the transmission of unsent PUSCH data retransmissions. Additionally, the apparatus may implement the selection procedure for uplink transmissions. The apparatus may also determine that data is unable to be retransmitted via the PUSCH, where the data that is determined unable to be retransmitted via the PUSCH may correspond to the unsent PUSCH data retransmissions. The apparatus may also transmit, to a base station, at least one uplink transmission based on the selection procedure for uplink transmissions. The apparatus may also transmit the data that is determined unable to be retransmitted via the PUSCH via a configured grant.

In another aspect of the disclosure, a method, a computer-readable medium, and an apparatus are provided. The apparatus may be a base station. The apparatus may determine a selection procedure for uplink transmissions, where the selection procedure may include information for uplink data retransmissions. The apparatus may also identify whether the transmission of unsent PUSCH data retransmissions is via a configured grant. Additionally, the apparatus may select a configured grant for the transmission of unsent PUSCH data retransmissions. The apparatus may also transmit, to a user equipment (UE), the selection procedure for uplink transmissions. Further, the apparatus may monitor for at least one uplink transmission from the UE based on the selection procedure for uplink transmissions. The apparatus may also receive the at least one uplink transmission from the UE based on the selection procedure for uplink transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
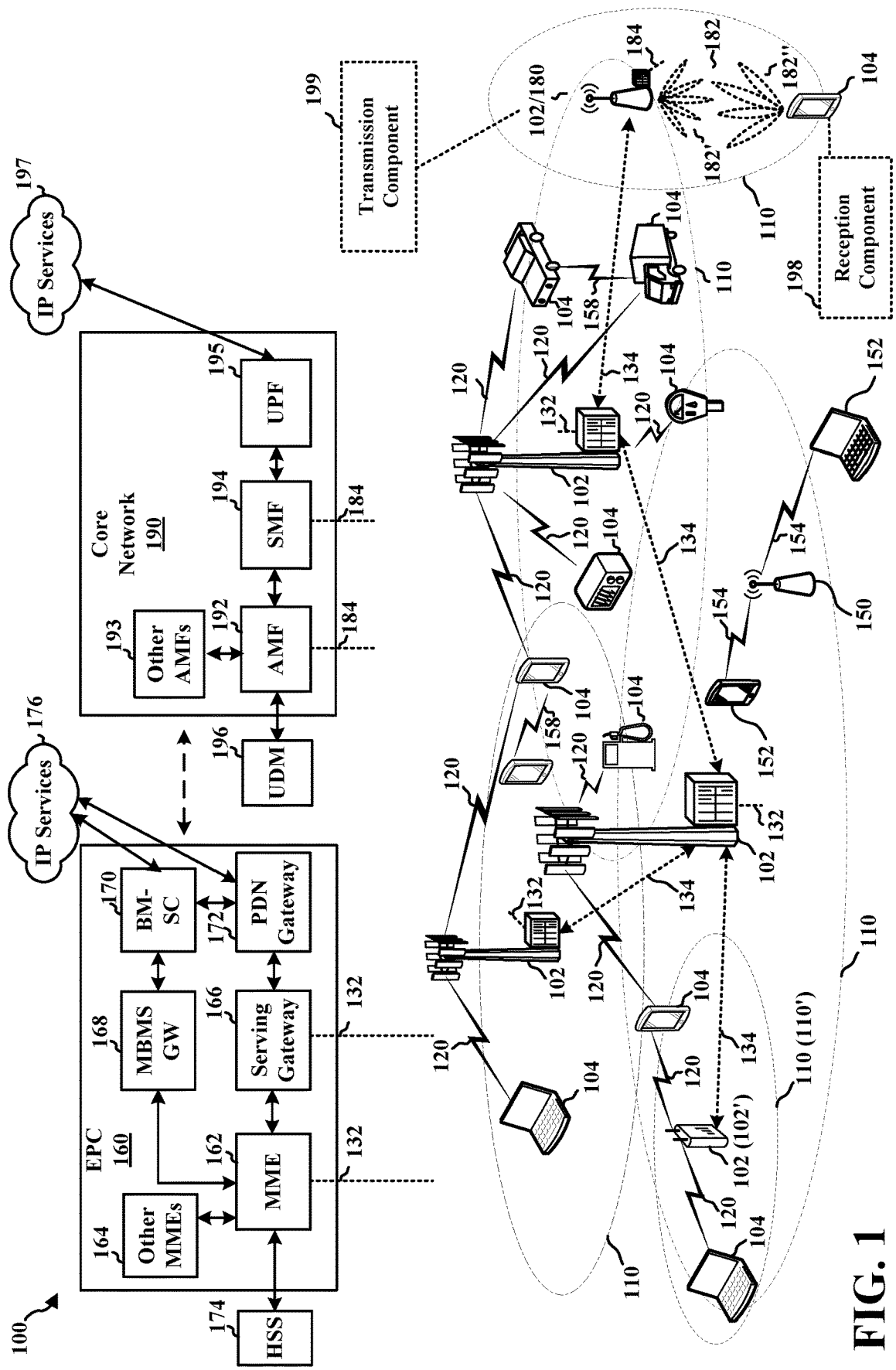
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive, from a base station, a selection procedure for uplink transmissions, where the selection procedure may include information for uplink data retransmissions. Reception component 198 may also be configured to implement the selection procedure for uplink transmissions. Reception component 198 may also be configured to determine that data is unable to be retransmitted via a PUSCH, where the data that is determined unable to be retransmitted via the PUSCH may correspond to unsent PUSCH data retransmissions. Reception component 198 may also be configured to transmit, to the base station, at least one uplink transmission based on the selection procedure for uplink transmissions. Reception component 198 may also be configured to transmit the data that is determined unable to be retransmitted via the PUSCH via a configured grant.

Referring again to FIG. 1, in certain aspects, the reception component 198 may be configured to determine a selection procedure for uplink transmissions, the selection procedure including information for uplink data retransmissions, where the information for uplink data retransmissions may correspond to specification information. Reception component 198 may also be configured to identify whether the transmission of unsent PUSCH data retransmissions is via a configured grant. Reception component 198 may also be configured to select a configured grant for the transmission of unsent PUSCH data retransmissions. Reception component 198 may also be configured to implement the selection procedure for uplink transmissions. Reception component 198 may also be configured to determine that data is unable to be retransmitted via a PUSCH, where the data that is determined unable to be retransmitted via the PUSCH may correspond to the unsent PUSCH data retransmissions. Reception component 198 may also be configured to transmit, to a base station, at least one uplink transmission based on the selection procedure for uplink transmissions. Reception component 198 may also be configured to transmit the data that is determined unable to be retransmitted via the PUSCH via a configured grant.

Referring again to FIG. 1, in certain aspects, the base station 180 may include a transmission component 199 configured to determine a selection procedure for uplink transmissions, where the selection procedure may include information for uplink data retransmissions. Transmission component 199 may also be configured to identify whether the transmission of unsent PUSCH data retransmissions is via a configured grant. Transmission component 199 may also be configured to select a configured grant for the transmission of unsent PUSCH data retransmissions. Transmission component 199 may also be configured to transmit, to a user equipment (UE), the selection procedure for uplink transmissions. Transmission component 199 may also be configured to monitor for at least one uplink transmission from the UE based on the selection procedure for uplink transmissions. Transmission component 199 may also be configured to receive the at least one uplink transmission from the UE based on the selection procedure for uplink transmissions.

Although the following description may be focused on 5G NR, the concepts described herein may be applicable to other similar areas, such as LTE, LTE-A, CDMA, GSM, and other wireless technologies.

Figure 2:
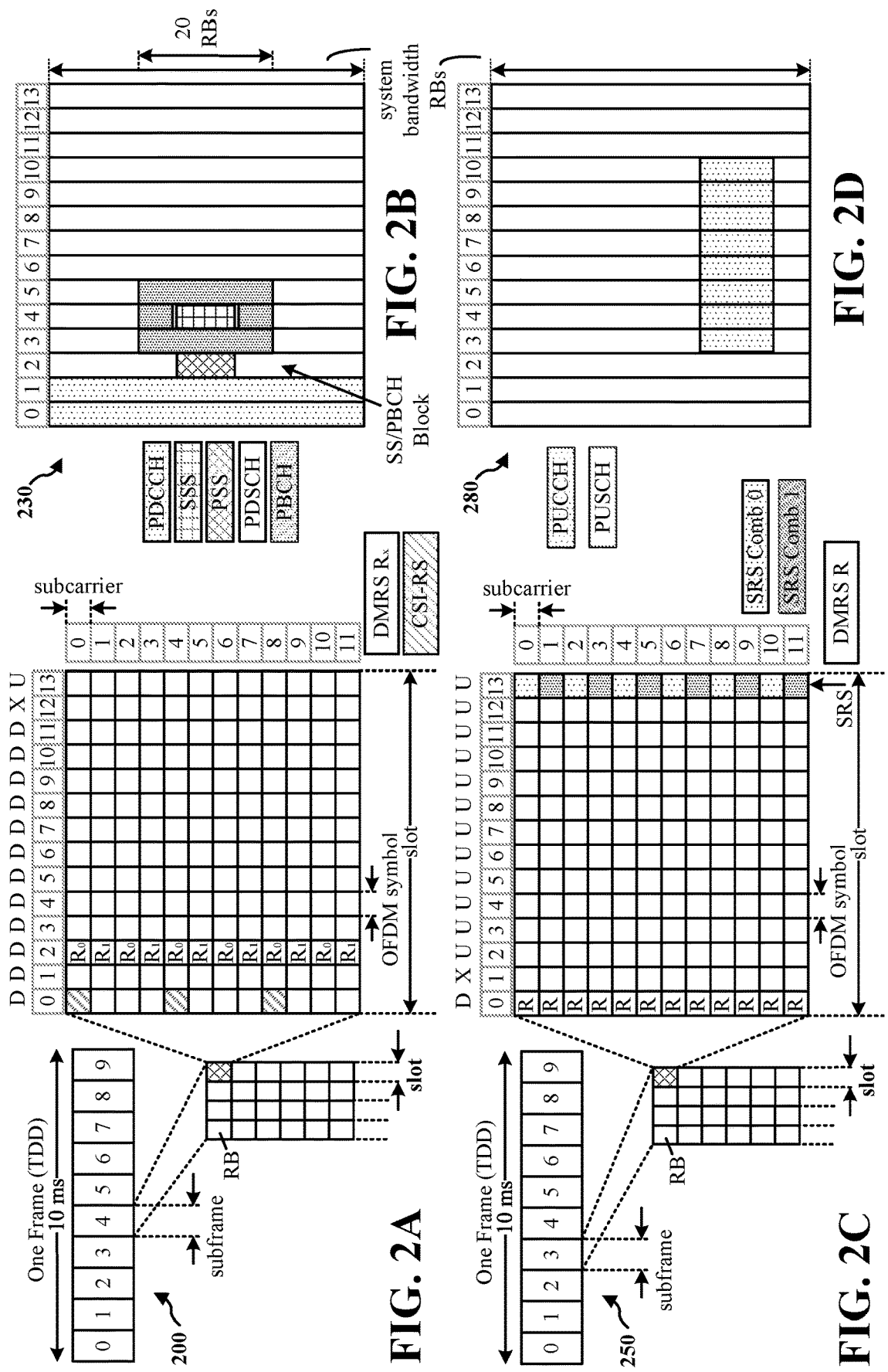
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µt=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
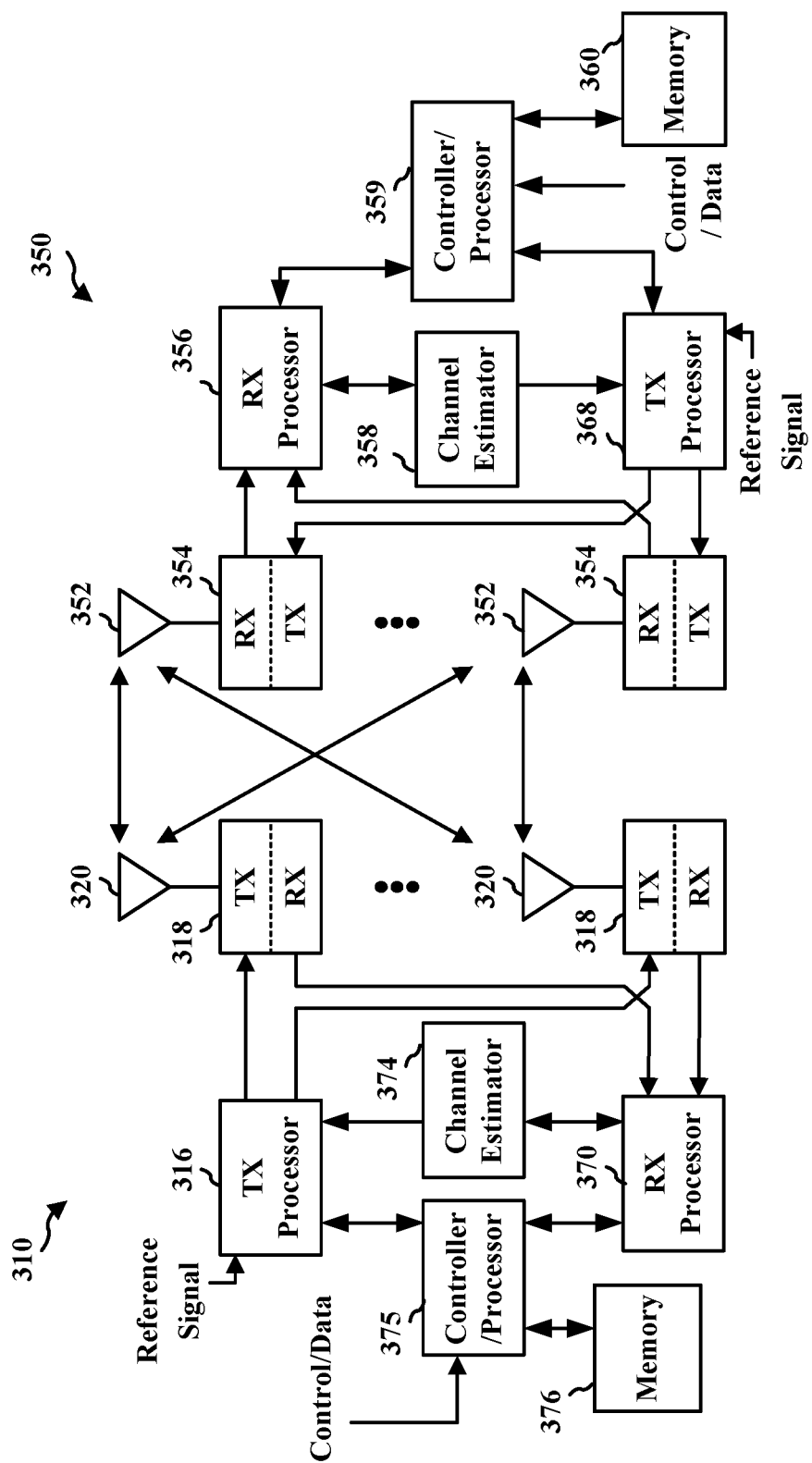
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium which may store computer executable code for wireless communication of a user equipment (UE), the code when executed by a processor (e.g., one or more of RX processor 356, TX processor 368, and/or controller/processor 359) instructs the processor to perform aspects of FIGS. 9, 10, and/or 11. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium which may store computer executable code for wireless communication of base station, the code when executed by a processor (e.g., one or more of RX processor 370, TX processor 316, and/or controller/processor 375) instructs the processor to perform aspects of FIGS. 9, 10, and/or 11. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some aspects of wireless communications, e.g., 5G new radio (NR), data retransmission or repetition may be introduced as a method to increase the coverage of the transmitted data. For instance, the reliability and/or coverage of transmitted data may be increased if the data is retransmitted or sent multiple times. For example, physical uplink shared channel (PUSCH) data retransmissions or PUSCH repetitions may increase the coverage of the uplink data.

In some aspects, if time resources assigned for a PUSCH data retransmission or a PUSCH repetition collide with one or multiple downlink symbols, e.g., as specified by a slot format indication (SFI), the PUSCH data retransmission or PUSCH repetition may be unsent or dropped. As such, an unsent PUSCH data retransmission or dropped PUSCH repetition is uplink data that was planned to be resent or repeated, but was unsuccessfully resent or repeated. Also, dropped or unsent PUSCH repetitions may result in a performance loss or loss in coverage.

Some aspects of wireless communications, e.g., NR, may also include uplink data transmission via a configured grant (CG). These configured grant transmissions may allow for uplink transmissions without a dynamic grant, i.e., without DCI. In a configured grant, the transmission resources may be configured for a particular device or UE, rather than being scheduled dynamically for each transmission. Also, a base station may configure the configured grant for one or more devices. So a configured grant may be associated with one or more devices sharing the transmission resources. In some aspects, a configured grant including parameters set by a configuration may be separated from a scheduled grant. Also, in some aspects, DCI may activate a configured grant. Further, uplink data transmission with a configured grant may be transmitted on a configured occasion with configured resources and/or transmission parameters.

Additionally, in order to avoid dropping or not sending PUSCH repetitions, some aspects of wireless communications may assign a larger nominal repetition number in order to account for occasional dropped repetitions. However, this may result in a continuous reservation of the uplink channel for a specific beam for a large block of data or a long time period. As such, this may result in blocking other UEs from accessing this particular data. Additionally, for some applications, latency issues may be more relaxed and it may be sufficient to transmit the dropped PUSCH repetitions at a later time.

In some aspects, when a PUSCH repetition is dropped or not sent, e.g., due to a downlink symbol collision, a UE may wait for a next scheduling period to transmit the dropped repetition. Some aspects of wireless communications may transmit certain PUSCH repetitions, e.g., repetitions that were dropped because of a downlink symbol collision, on a configured grant. However, the guidelines for selecting the transmission of dropped PUSCH resources on a configured grant are inconsistent. Base stations and UEs may benefit from more consistent guidelines for selecting the transmission of dropped PUSCH resources or unsent PUSCH retransmissions. As such, it may be beneficial to determine guidelines for selecting the transmission of dropped PUSCH resources, e.g., via a configured grant.

Aspects of the present disclosure may include guidelines for selecting the transmission of dropped PUSCH resources or unsent PUSCH retransmissions, e.g., via a configured grant. Indeed, aspects of the present disclosure may determine whether to transmit dropped PUSCH resources or unsent PUSCH retransmissions. Aspects of the present disclosure may also select a configured grant for transmitting the dropped PUSCH resources or unsent PUSCH retransmissions. Accordingly, aspects of the present disclosure may determine when to transmit dropped PUSCH resources over a configured grant, as well as determine which configured grant may transmit the dropped PUSCH resources.

As indicated herein, aspects of the present disclosure may select whether to transmit dropped PUSCH repetitions or unsent PUSCH retransmissions via a configured grant. In some aspects, determining which configured grant to be selected for the transmission of dropped PUSCH repetitions may depend on the number of dropped PUSCH repetitions. The configured grant to be selected may also depend on spatial relations or quasi co-location (QCL) assumptions of the original dropped PUSCH repetitions. As such, among a number of different configured grants, a UE may select a configured grant based on a matching spatial relation or QCL with the dropped PUSCH repetitions.

In some instances, transmission of the dropped PUSCH repetitions on a configured grant may be triggered if the number of dropped repetitions surpasses a certain threshold. Also, the transmission of the dropped PUSCH repetitions on a configured grant may be triggered if the ratio of dropped PUSCH repetitions to the total number of PUSCH repetitions surpasses a certain threshold. For example, if the amount of dropped repetitions is greater than a certain number, e.g., two or three, or if the number of dropped repetitions is greater than half of the number of total repetitions, then the UE may select the retransmission by transmitting over a configured grant.

Further, the number of dropped PUSCH resources may also affect a choice of configured grant, e.g., among multiple configured grants. So there may be multiple configured grants, and one configured grant may provide more resources or a more frequent periodicity, which may affect the choice of configured grant. In some aspects, these guidelines may be configured by the base station, e.g., via RRC signaling or an RRC configuration. The choice of configured grant, e.g., among multiple configured grants, may also depend on the timing of the dropped PUSCH repetitions and/or configured grant occasions. In some instances, a configured grant closest to a certain PUSCH repetition, e.g., the last sent PUSCH repetition, may be selected. In addition, if one configured grant is already selected, the spatial relation or quasi co-location (QCL) of the original dropped repetitions may override the decision to select a particular configured grant.

In addition, certain guidelines according to aspects of the present disclosure for selecting whether to transmit dropped PUSCH repetitions or unsent PUSCH retransmissions on a configured grant may be specified in a standard specification or configured by a base station, e.g., via RRC signaling or an RRC configuration. Also, guidelines for selecting a certain configured grant for the transmission of dropped PUSCH repetitions may be specified in a standard specification or configured by a base station. Moreover, the dropped PUSCH repetition guidelines may apply if the PUSCH repetitions are dropped based on a downlink symbol collision and/or based on a cancellation indication by base station, e.g., via group common DCI (GC-DCI). So aspects of the present disclosure may include a cancellation indication, which may be a group common DCI that indicates to certain UEs to not transmit over some resources for a period of time. In some instances, these cancellation indications may also cause PUSCH repetitions to be dropped.

As indicated herein, in some aspects, the guidelines for dropped PUSCH repetitions may be selected by a base station. So the base station may set the guidelines for dropped PUSCH repetitions and then inform the UE of these guidelines. For example, the base station may inform the UE that if certain PUSCH repetitions are dropped or unsent, the UE may transmit these PUSCH repetitions on a certain configured grant. In some aspects, the base station may inform the UE of the dropped PUSCH repetitions if the number of dropped PUSCH repetitions is greater than a certain threshold, e.g., two or three, or is greater than a percentage, e.g., 50%, of the amount of total PUSCH repetitions. So in some aspects, the process to address dropped PUSCH repetitions may be pre-determined or semi-statically set by the base station, i.e., without any dynamic signaling between the base station and UE.

As mentioned above, the base station may inform the UE of the dropped PUSCH repetition guidelines via RRC signaling or an RRC configuration. In some aspects, if the guidelines for dropped PUSCH repetitions are set in a standard specification, then the base station may not inform the UE of these guidelines. So the guidelines may be semi-statically configured by the base station, as well as included in a standard specification. In some instances, the base station may be able to adjust the guidelines for dropped PUSCH repetitions based on the actual dropped PUSCH repetitions. For example, this guideline adjustment may be performed via RRC signaling or an RRC configuration. Additionally, the base station may transmit the guidelines for dropped PUSCH repetitions based on a spatial relation or QCL information. For instance, the spatial relation or QCL of the original dropped repetitions may override a previously selected configured grant.

In some aspects, other transmission parameters for the dropped PUSCH repetitions may override a selected configured grant. For example, a modulation and coding scheme (MCS) or modulation of the dropped repetitions may override the configured grant that carries the guidelines. Also, a configured grant may include some prior configuration regarding the uplink transmission, and the dropped PUSCH repetition may include uplink parameters based on the scheduling. Indeed, if multiple guidelines for uplink data repetitions or retransmissions are conflicting, then one guideline may override or overrule another guideline.

Figure 4:
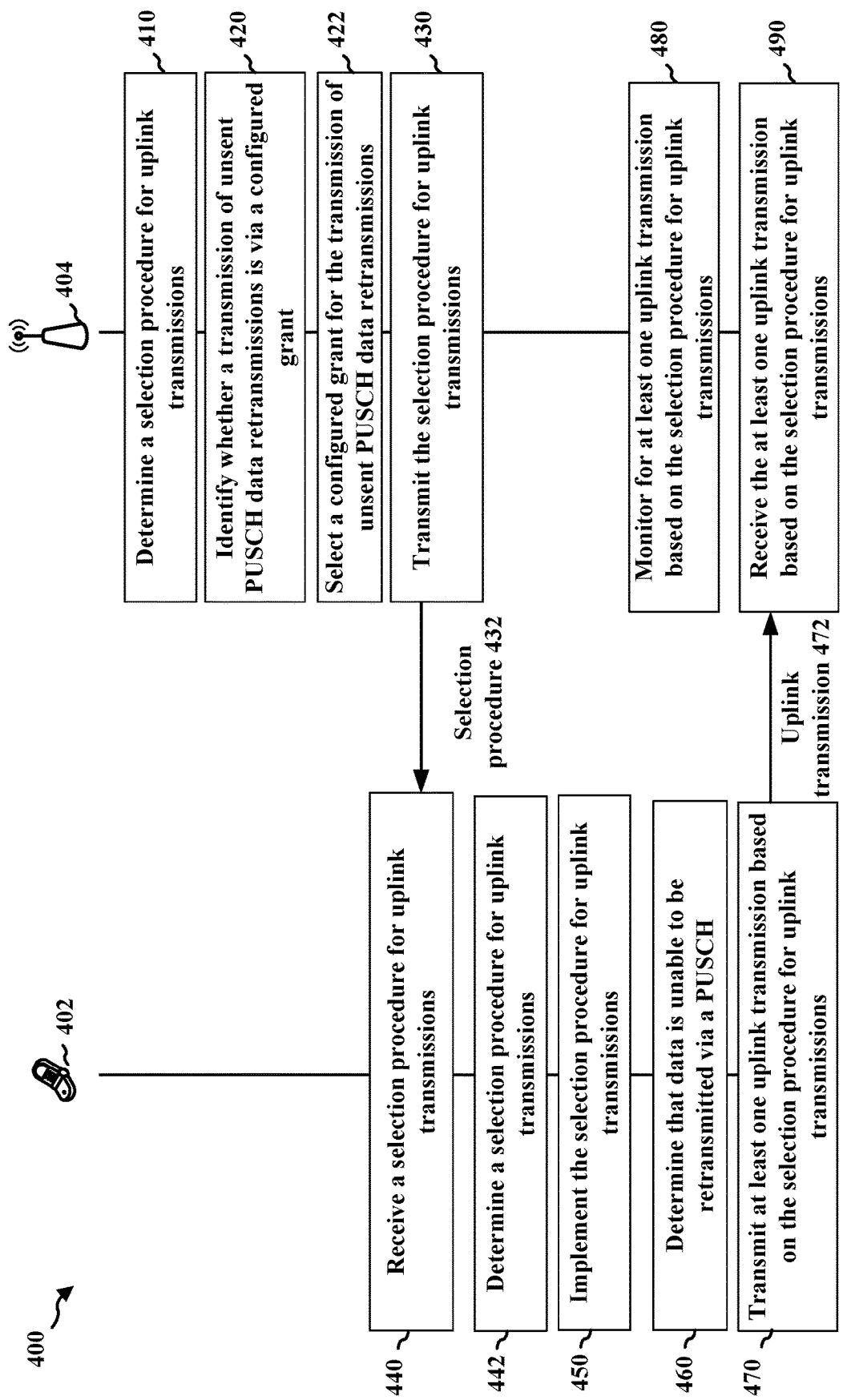
FIG. 4 is a diagram illustrating example communication between a UE and a base station in accordance with one or more techniques of the present disclosure.

FIG. 4 is a diagram 400 illustrating example communication between a UE 402 and a base station 404. At 410, base station 404 may determine a selection procedure for uplink transmissions, where the selection procedure may include information for uplink data retransmissions. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH.

At 420, base station 404 may identify whether the transmission of unsent PUSCH data retransmissions is via a configured grant. In some aspects, the information for uplink data retransmissions may identify whether the transmission of unsent PUSCH data retransmissions is via a configured grant.

At 422, base station 404 may select a configured grant for the transmission of unsent PUSCH data retransmissions. Also, the configured grant for the transmission of unsent PUSCH data retransmissions may be selected based on a timeline of the transmission of unsent PUSCH data retransmissions.

In some aspects, the selection procedure for uplink transmissions may be based on a number of unsent PUSCH data retransmissions. Also, the selection procedure for uplink transmissions may be based on whether the number of unsent PUSCH data retransmissions is greater than an unsent retransmission threshold. Additionally, the selection procedure for uplink transmissions may be based on whether a ratio of the number of unsent PUSCH data retransmissions to a number of total PUSCH data retransmissions is greater than a ratio threshold.

At 430, base station 404 may transmit, to UE 402, the selection procedure, e.g., selection procedure 432, for uplink transmissions. In some instances, the selection procedure for uplink transmissions may be transmitted via radio resource control (RRC) signaling or an RRC configuration.

At 440, UE 402 may receive, from base station 404, a selection procedure, e.g., selection procedure 432, for uplink transmissions, where the selection procedure may include information for uplink data retransmissions.

At 442, UE 402 may determine a selection procedure for uplink transmissions, where the selection procedure may include information for uplink data retransmissions.

At 450, UE 402 may implement the selection procedure for uplink transmissions.

At 460, UE 402 may determine that data is unable to be retransmitted via a PUSCH, where the data that is determined unable to be retransmitted via the PUSCH may correspond to unsent PUSCH data retransmissions.

At 470, UE 402 may transmit, to base station 404, at least one uplink transmission, e.g., uplink transmission 472, based on the selection procedure for uplink transmissions. UE 402 may also transmit the data that is determined unable to be retransmitted via the PUSCH via a configured grant.

At 480, base station 404 may monitor for at least one uplink transmission from the UE 402 based on the selection procedure for uplink transmissions.

At 490, base station 404 may receive the at least one uplink transmission, e.g., uplink transmission 472, from UE 402 based on the selection procedure for uplink transmissions. In some aspects, the at least one uplink transmission may be transmitted or received via a configured grant or the PUSCH. Also, the at least one uplink transmission may include a number of unsent PUSCH data retransmissions.

In some aspects, the selection procedure for uplink transmissions may be based on a spatial relation or quasi co-location (QCL) information. Also, the selection procedure for uplink transmissions may be based on unsent PUSCH resources. The selection procedure for uplink transmissions may also correspond to specification information. Moreover, the uplink data retransmissions may correspond to uplink data that is transmitted more than once.

Figure 5:
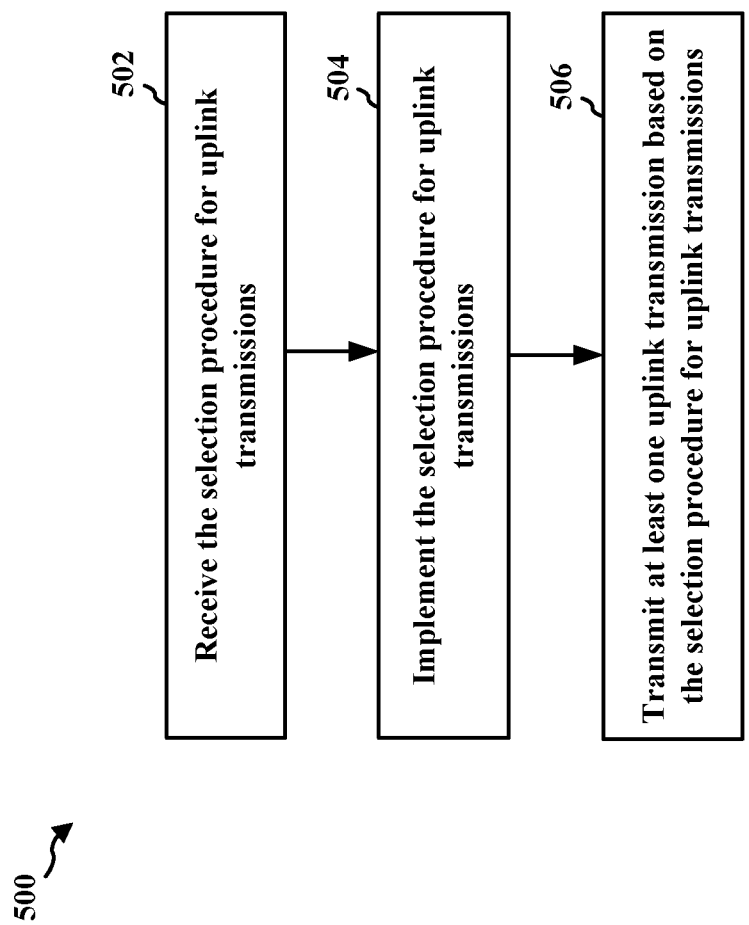
FIG. 5 is a flowchart of a method of wireless communication.

FIG. 5 is a flowchart 500 of a method of wireless communication. The method may be performed by a UE or a component of a UE (e.g., the UE 104, 350, 402; apparatus 1002; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 502, the apparatus may receive, from a base station, a selection procedure for uplink transmissions, where the selection procedure may include information for uplink data retransmissions, as described in connection with the example in FIG. 4. For example, UE 402 may receive, from a base station, a selection procedure for uplink transmissions, where the selection procedure may include information for uplink data retransmissions, as described in connection with 440 in FIG. 4. Further, step 502 may be performed by determination component 1040 in FIG. 10. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH. Additionally, the selection procedure for uplink transmissions may be received via radio resource control (RRC) signaling or an RRC configuration.

At 504, the apparatus may implement the selection procedure for uplink transmissions, as described in connection with the example in FIG. 4. For example, UE 402 may implement the selection procedure for uplink transmissions, as described in connection with 450 in FIG. 4. Further, step 504 may be performed by determination component 1040 in FIG. 10. In some instances, the information for uplink data retransmissions may identify whether the transmission of unsent PUSCH data retransmissions is via a configured grant. Also, the information for uplink data retransmissions may include a configured grant for the transmission of unsent PUSCH data retransmissions. Further, the configured grant for the transmission of unsent PUSCH data retransmissions may be based on a timeline of the transmission of unsent PUSCH data retransmissions.

At 506, the apparatus may transmit, to the base station, at least one uplink transmission based on the selection procedure for uplink transmissions, as described in connection with the example in FIG. 4. For example, UE 402 may transmit, to the base station, at least one uplink transmission based on the selection procedure for uplink transmissions, as described in connection with 470 in FIG. 4. Further, step 506 may be performed by determination component 1040 in FIG. 10. At 506, the apparatus may also transmit the data via a configured grant, as described in connection with the example in FIG. 4. In some aspects, the at least one uplink transmission may be transmitted via a configured grant or the PUSCH. Also, the at least one uplink transmission may include a number of unsent PUSCH data retransmissions.

Figure 6:
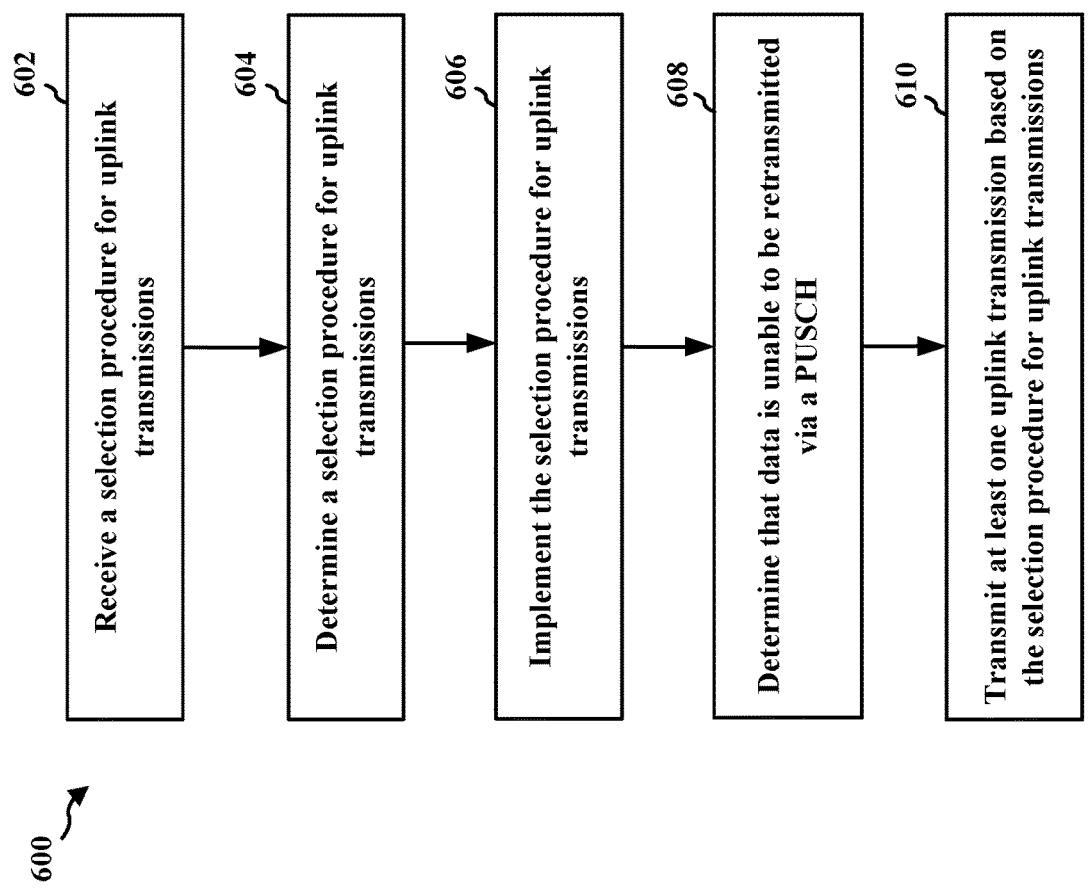
FIG. 6 is a flowchart of a method of wireless communication.

FIG. 6 is a flowchart 600 of a method of wireless communication. The method may be performed by a UE or a component of a UE (e.g., the UE 104, 350, 402; apparatus 1002; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 602, the apparatus may receive, from a base station, a selection procedure for uplink transmissions, where the selection procedure may include information for uplink data retransmissions, as described in connection with the example in FIG. 4. For example, UE 402 may receive, from a base station, a selection procedure for uplink transmissions, where the selection procedure may include information for uplink data retransmissions, as described in connection with 440 in FIG. 4. Further, step 602 may be performed by determination component 1040 in FIG. 10. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH. Additionally, the selection procedure for uplink transmissions may be received via radio resource control (RRC) signaling or an RRC configuration.

At 604, the apparatus may determine a selection procedure for uplink transmissions, the selection procedure for uplink transmissions including information for uplink data retransmissions, where the information for uplink data retransmissions may correspond to specification information. For example, UE 402 may determine a selection procedure for uplink transmissions, the selection procedure including information for uplink data retransmissions, where the information for uplink data retransmissions may correspond to specification information, as described in connection with 442 in FIG. 4. Further, step 604 may be performed by determination component 1040 in FIG. 10.

At 606, the apparatus may implement the selection procedure for uplink transmissions, as described in connection with the example in FIG. 4. For example, UE 402 may implement the selection procedure for uplink transmissions, as described in connection with 450 in FIG. 4. Further, step 606 may be performed by determination component 1040 in FIG. 10. In some instances, the information for uplink data retransmissions may identify whether the transmission of unsent PUSCH data retransmissions is via a configured grant. Also, the information for uplink data retransmissions may include a configured grant for the transmission of unsent PUSCH data retransmissions. Further, the configured grant for the transmission of unsent PUSCH data retransmissions may be based on a timeline of the transmission of unsent PUSCH data retransmissions.

In some aspects, the selection procedure for uplink transmissions may be based on a number of unsent PUSCH data retransmissions. Also, the selection procedure for uplink transmissions may be based on whether the number of unsent PUSCH data retransmissions is greater than an unsent retransmission threshold. Additionally, the selection procedure for uplink transmissions may be based on whether a ratio of the number of unsent PUSCH data retransmissions to a number of total PUSCH data retransmissions is greater than a ratio threshold.

At 608, the apparatus may determine that data is unable to be retransmitted via a PUSCH, where the data that is determined unable to be retransmitted via the PUSCH may correspond to unsent PUSCH data retransmissions, as described in connection with the example in FIG. 4. For example, UE 402 may determine that data is unable to be retransmitted via a PUSCH, where the data that is determined unable to be retransmitted via the PUSCH may correspond to unsent PUSCH data retransmissions, as described in connection with 460 in FIG. 4. Further, step 608 may be performed by determination component 1040 in FIG. 10.

At 610, the apparatus may transmit, to the base station, at least one uplink transmission based on the selection procedure for uplink transmissions, as described in connection with the example in FIG. 4. For example, UE 402 may transmit, to the base station, at least one uplink transmission based on the selection procedure for uplink transmissions, as described in connection with 470 in FIG. 4. Further, step 610 may be performed by determination component 1040 in FIG. 10. At 610, the apparatus may also transmit the data that is determined unable to be retransmitted via the PUSCH via a configured grant, as described in connection with the example in FIG. 4. In some aspects, the at least one uplink transmission may be transmitted via a configured grant or the PUSCH. Also, the at least one uplink transmission may include a number of unsent PUSCH data retransmissions.

In some aspects, the selection procedure for uplink transmissions may be based on a spatial relation or quasi co-location (QCL) information. Also, the selection procedure for uplink transmissions may be based on unsent PUSCH resources. The selection procedure for uplink transmissions may also correspond to specification information. Moreover, the uplink data retransmissions may correspond to uplink data that is transmitted more than once.

Figure 7:
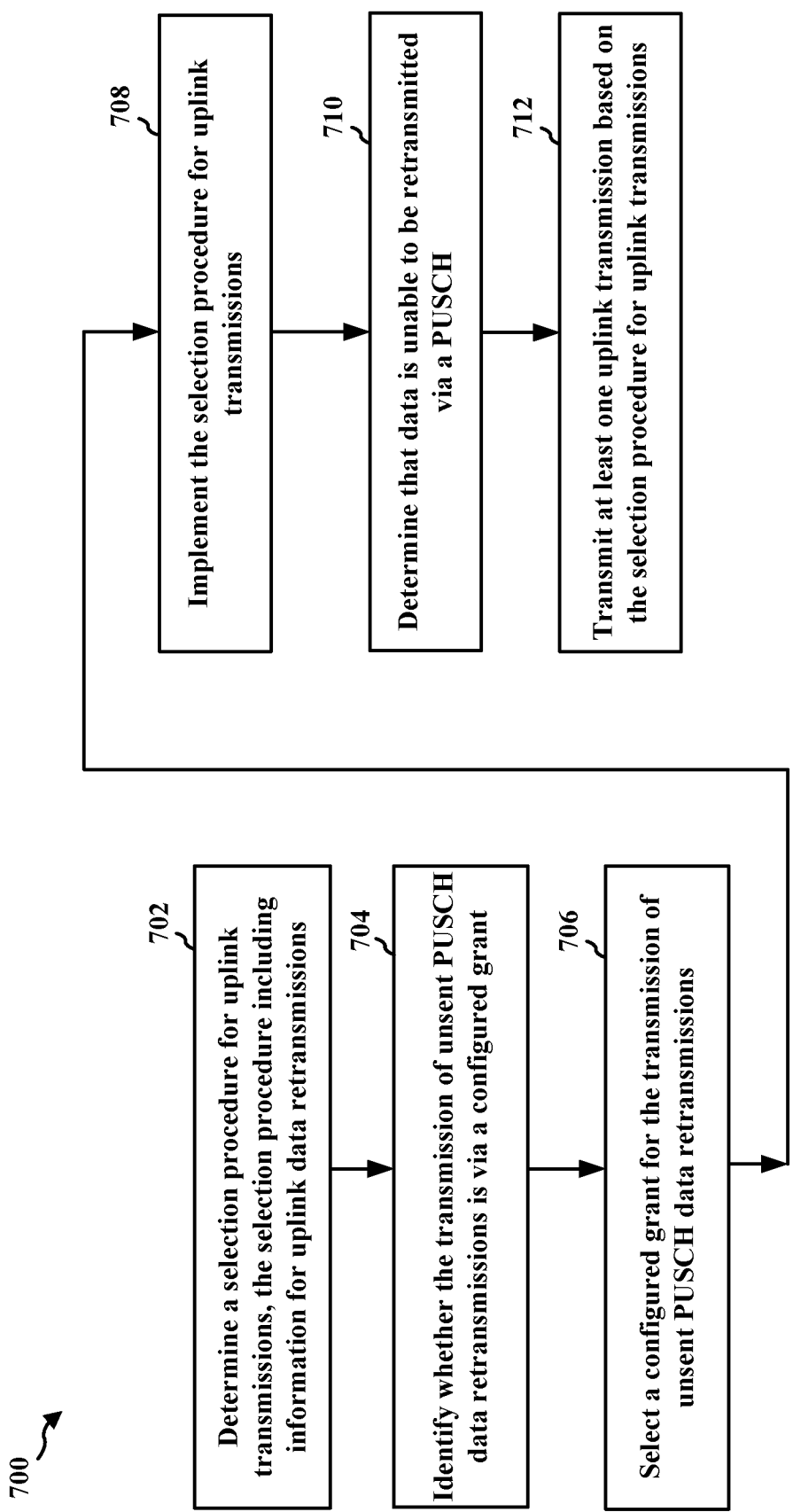
FIG. 7 is a flowchart of a method of wireless communication.

FIG. 7 is a flowchart 700 of a method of wireless communication. The method may be performed by a UE or a component of a UE (e.g., the UE 104, 350, 402; apparatus 1002; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 702, the apparatus may determine a selection procedure for uplink transmissions, the selection procedure including information for uplink data retransmissions, where the information for uplink data retransmissions may correspond to specification information. Further, step 702 may be performed by determination component 1040 in FIG. 10. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH.

At 704, the apparatus may identify whether the transmission of unsent PUSCH data retransmissions is via a configured grant. Further, step 704 may be performed by determination component 1040 in FIG. 10. In some aspects, the information for uplink data retransmissions may identify whether the transmission of unsent PUSCH data retransmissions is via a configured grant.

At 706, the apparatus may select a configured grant for the transmission of unsent PUSCH data retransmissions. Further, step 706 may be performed by determination component 1040 in FIG. 10.

At 708, the apparatus may implement the selection procedure for uplink transmissions. Further, step 708 may be performed by determination component 1040 in FIG. 10.

At 710, the apparatus may determine that data is unable to be retransmitted via a PUSCH, where the data that is determined unable to be retransmitted via the PUSCH may correspond to the unsent PUSCH data retransmissions. Further, step 710 may be performed by determination component 1040 in FIG. 10.

At 712, the apparatus may transmit, to a base station, at least one uplink transmission based on the selection procedure for uplink transmissions. At 712, the apparatus may also transmit the data via a configured grant. Further, step 712 may be performed by determination component 1040 in FIG. 10.

Figure 8:
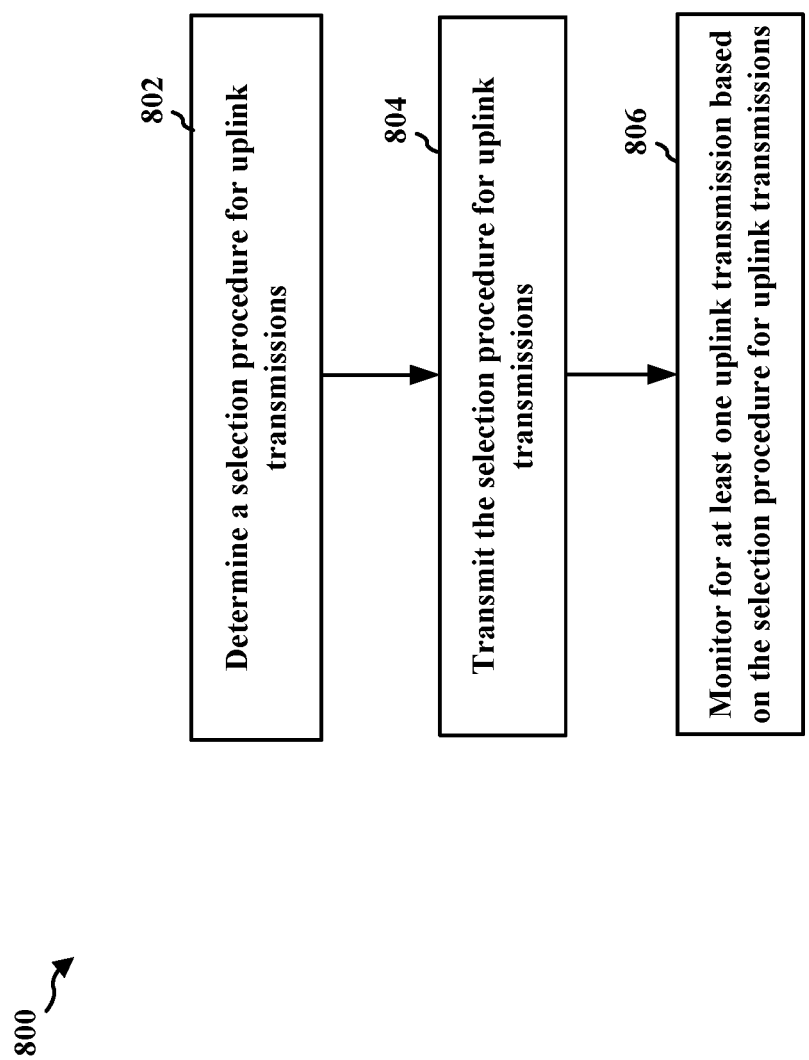
FIG. 8 is a flowchart of a method of wireless communication.

FIG. 8 is a flowchart 800 of a method of wireless communication. The method may be performed by a base station or a component of a base station (e.g., the base station 102, 180, 310, 404; apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 802, the apparatus may determine a selection procedure for uplink transmissions, where the selection procedure may include information for uplink data retransmissions, as described in connection with the example in FIG. 4. For example, base station 404 may determine a selection procedure for uplink transmissions, where the selection procedure may include information for uplink data retransmissions, as described in connection with 410 in FIG. 4. Further, step 802 may be performed by determination component 1140 in FIG. 11. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH.

At 804, the apparatus may transmit, to a UE, the selection procedure for uplink transmissions, as described in connection with the example in FIG. 4. For example, base station 404 may transmit, to a UE, the selection procedure for uplink transmissions, as described in connection with 430 in FIG. 4. Further, step 804 may be performed by determination component 1140 in FIG. 11. In some instances, the selection procedure for uplink transmissions may be transmitted via radio resource control (RRC) signaling or an RRC configuration.

At 806, the apparatus may monitor for at least one uplink transmission from the UE based on the selection procedure for uplink transmissions, as described in connection with the example in FIG. 4. For example, base station 404 may monitor for at least one uplink transmission from the UE based on the selection procedure for uplink transmissions, as described in connection with 480 in FIG. 4. Further, step 806 may be performed by determination component 1140 in FIG. 11.

Figure 9:
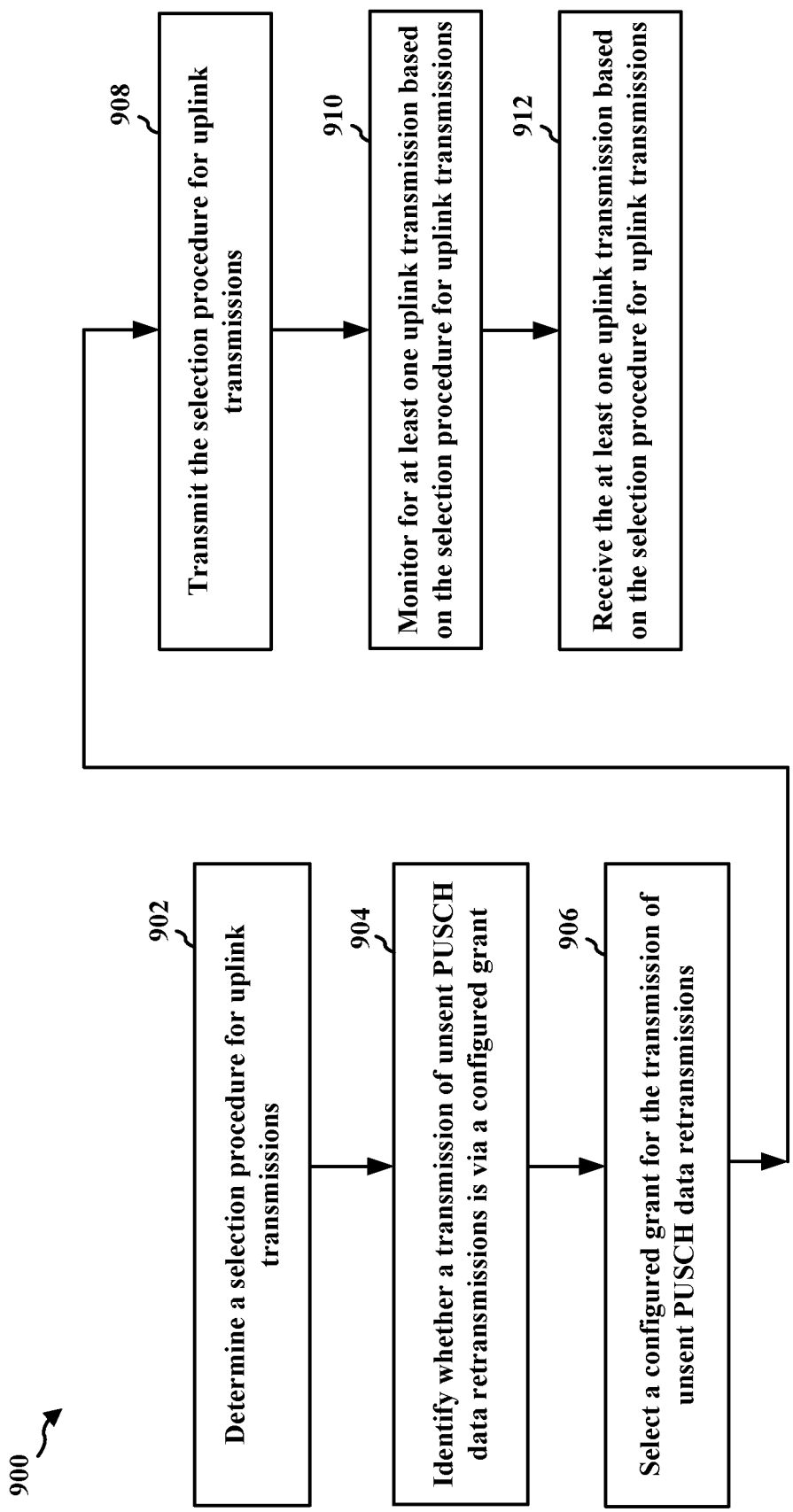
FIG. 9 is a flowchart of a method of wireless communication.

FIG. 9 is a flowchart 900 of a method of wireless communication. The method may be performed by a base station or a component of a base station (e.g., the base station 102, 180, 310, 404; apparatus 1102; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 902, the apparatus may determine a selection procedure for uplink transmissions, where the selection procedure may include information for uplink data retransmissions, as described in connection with the example in FIG. 4. For example, base station 404 may determine a selection procedure for uplink transmissions, where the selection procedure may include information for uplink data retransmissions, as described in connection with 410 in FIG. 4. Further, step 902 may be performed by determination component 1140 in FIG. 11. In some aspects, the information for uplink data retransmissions may be associated with a transmission of unsent PUSCH data retransmissions. Also, the unsent PUSCH data retransmissions may correspond to data that is transmitted via a configured grant when the data is unable to be retransmitted via a PUSCH.

At 904, the apparatus may identify whether the transmission of unsent PUSCH data retransmissions is via a configured grant, as described in connection with the example in FIG. 4. For example, base station 404 may identify whether the transmission of unsent PUSCH data retransmissions is via a configured grant, as described in connection with 420 in FIG. 4. Further, step 904 may be performed by determination component 1140 in FIG. 11. In some aspects, the information for uplink data retransmissions may identify whether the transmission of unsent PUSCH data retransmissions is via a configured grant.

At 906, the apparatus may select a configured grant for the transmission of unsent PUSCH data retransmissions, as described in connection with the example in FIG. 4. For example, base station 404 may select a configured grant for the transmission of unsent PUSCH data retransmissions, as described in connection with 422 in FIG. 4. Further, step 906 may be performed by determination component 1140 in FIG. 11. Also, the configured grant for the transmission of unsent PUSCH data retransmissions may be selected based on a timeline of the transmission of unsent PUSCH data retransmissions.

In some aspects, the selection procedure for uplink transmissions may be based on a number of unsent PUSCH data retransmissions. Also, the selection procedure for uplink transmissions may be based on whether the number of unsent PUSCH data retransmissions is greater than an unsent retransmission threshold. Additionally, the selection procedure for uplink transmissions may be based on whether a ratio of the number of unsent PUSCH data retransmissions to a number of total PUSCH data retransmissions is greater than a ratio threshold.

At 908, the apparatus may transmit, to a UE, the selection procedure for uplink transmissions, as described in connection with the example in FIG. 4. For example, base station 404 may transmit, to a UE, the selection procedure for uplink transmissions, as described in connection with 430 in FIG. 4. Further, step 908 may be performed by determination component 1140 in FIG. 11. In some instances, the selection procedure for uplink transmissions may be transmitted via radio resource control (RRC) signaling or an RRC configuration.

At 910, the apparatus may monitor for at least one uplink transmission from the UE based on the selection procedure for uplink transmissions, as described in connection with the example in FIG. 4. For example, base station 404 may monitor for at least one uplink transmission from the UE based on the selection procedure for uplink transmissions, as described in connection with 480 in FIG. 4. Further, step 910 may be performed by determination component 1140 in FIG. 11.

At 912, the apparatus may receive the at least one uplink transmission from the UE based on the selection procedure for uplink transmissions, as described in connection with the example in FIG. 4. For example, base station 404 may receive the at least one uplink transmission from the UE based on the selection procedure for uplink transmissions, as described in connection with 490 in FIG. 4. Further, step 912 may be performed by determination component 1140 in FIG. 11. In some aspects, the at least one uplink transmission may be received via a configured grant or the PUSCH. Also, the at least one uplink transmission may include a number of unsent PUSCH data retransmissions.

In some aspects, the selection procedure for uplink transmissions may be based on a spatial relation or quasi co-location (QCL) information. Also, the selection procedure for uplink transmissions may be based on unsent PUSCH resources. The selection procedure for uplink transmissions may also correspond to specification information. Moreover, the uplink data retransmissions may correspond to uplink data that is transmitted more than once.

Figure 10:
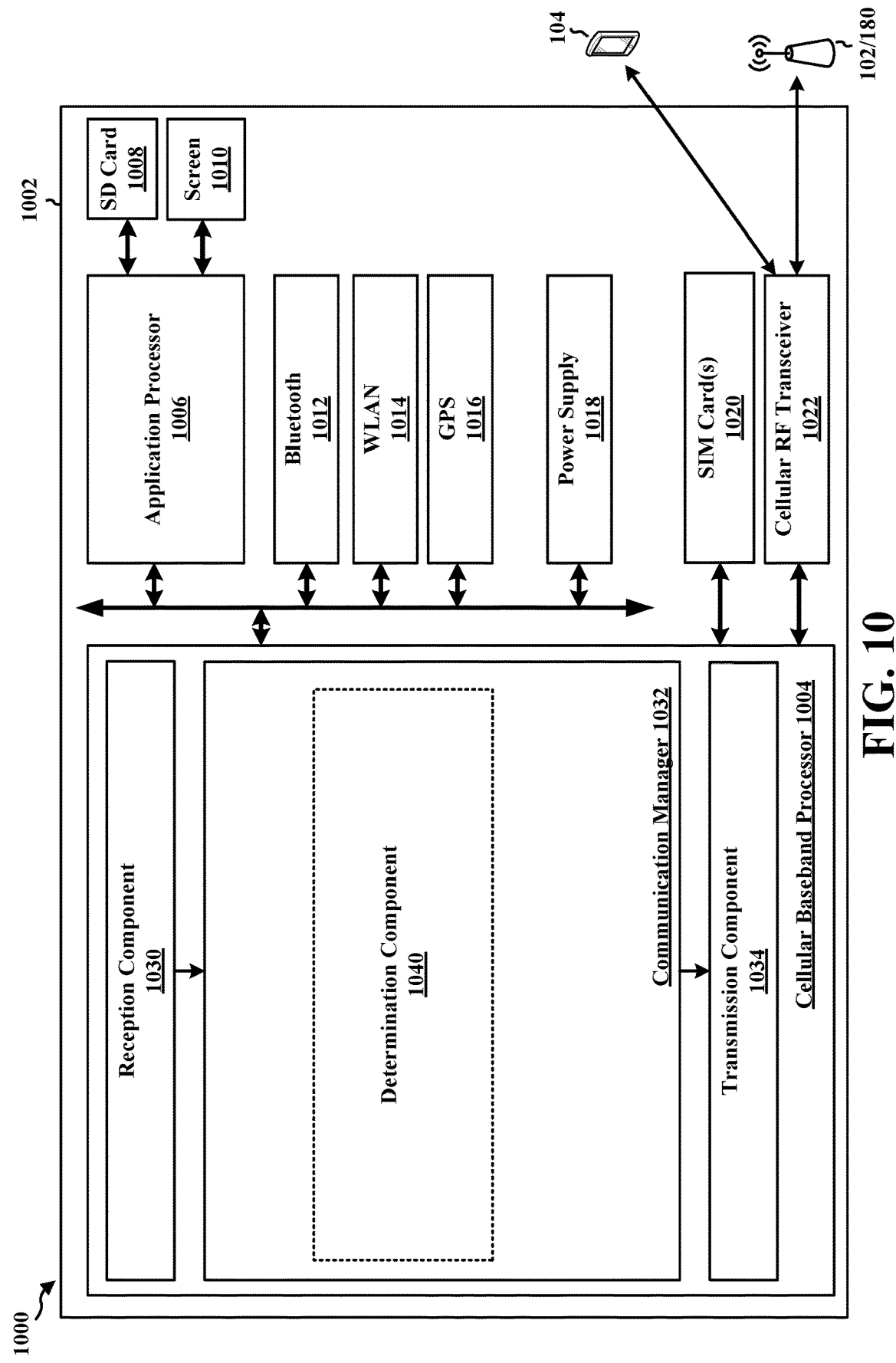
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a determination component 1040 that is configured to receive, from a base station, a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH, e.g., as described in connection with step 602 in FIG. 6. Determination component 1040 may be further configured to determine a selection procedure for uplink transmissions, the selection procedure including information for uplink data retransmissions, where the information for uplink data retransmissions corresponds to specification information, e.g., as described in connection with step 604 in FIG. 6. Determination component 1040 may be further configured to implement the selection procedure for uplink transmissions, e.g., as described in connection with step 606 in FIG. 6. Determination component 1040 may be further configured to determine that data is unable to be retransmitted via a PUSCH, where the data corresponds to the unsent PUSCH data retransmissions, e.g., as described in connection with step 608 in FIG. 6. Determination component 1040 may be further configured to transmit, to the base station, at least one uplink transmission based on the selection procedure for uplink transmissions, e.g., as described in connection with step 610 in FIG. 6.

The apparatus may include additional components that perform each of the blocks of the algorithm in the aforementioned flowcharts of FIGS. 4 and 6. As such, each block in the aforementioned flowcharts of FIGS. 4 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for receiving, from a base station, a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH; means for determining a selection procedure for uplink transmissions, the selection procedure including information for uplink data retransmissions, where the information for uplink data retransmissions corresponds to specification information; means for implementing the selection procedure for uplink transmissions; means for determining that data is unable to be retransmitted via a PUSCH, where the data corresponds to the unsent PUSCH data retransmissions; and means for transmitting, to the base station, at least one uplink transmission based on the selection procedure for uplink transmissions. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
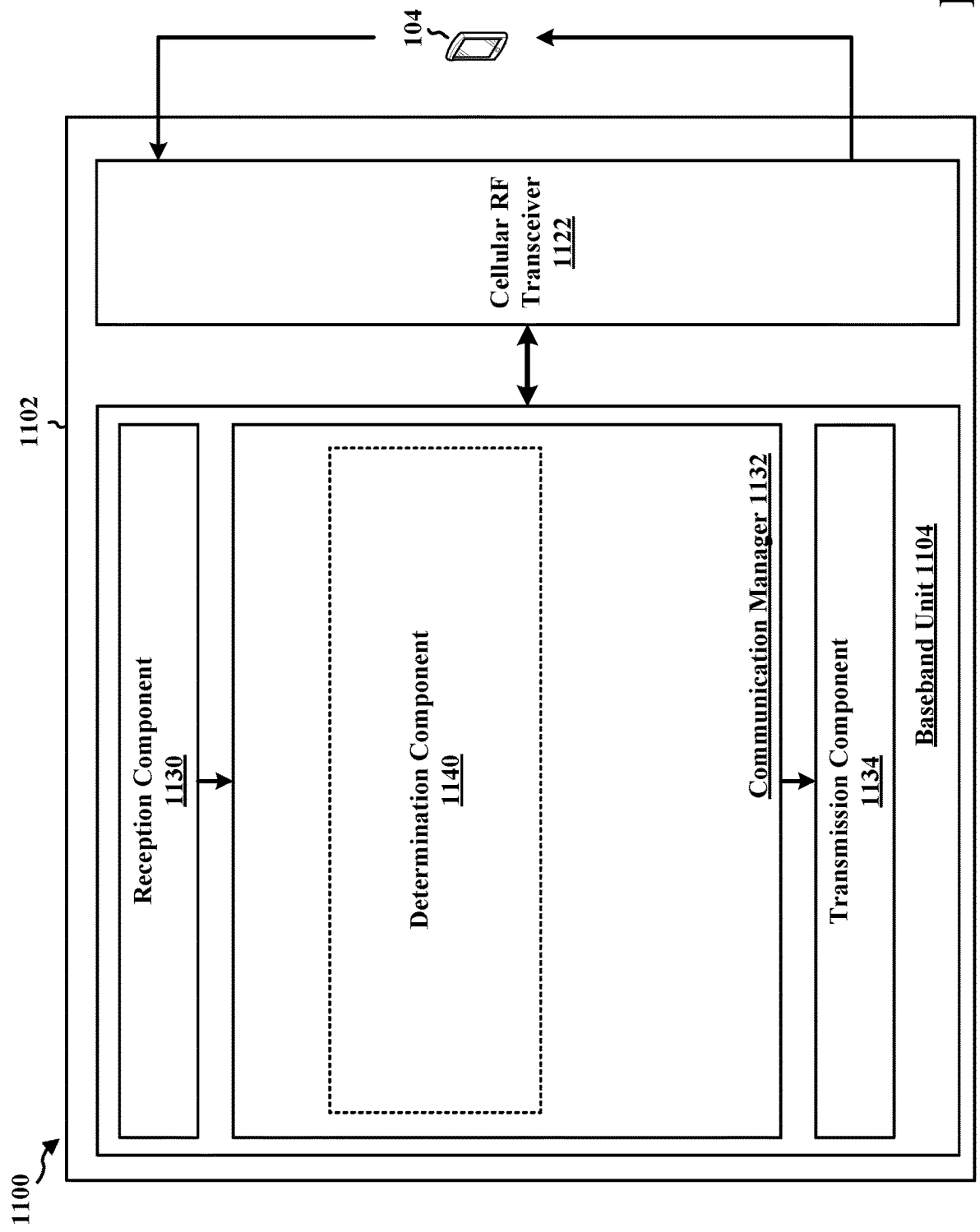
FIG. 11 is a diagram illustrating an example of a hardware implementation for an example apparatus.

FIG. 11 is a diagram 1100 illustrating an example of a hardware implementation for an apparatus 1102. The apparatus 1102 is a base station (BS) and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a determination component 1140 that is configured to determine a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH, e.g., as described in connection with step 902 in FIG. 9. Determination component 1140 may be further configured to identify whether the transmission of unsent PUSCH data retransmissions is via a configured grant, where the information for uplink data retransmissions identifies whether the transmission of unsent PUSCH data retransmissions is via a configured grant, e.g., as described in connection with step 904 in FIG. 9. Determination component 1140 may be further configured to select a configured grant for the transmission of unsent PUSCH data retransmissions, where the configured grant is selected based on a timeline of the transmission of unsent PUSCH data retransmissions, e.g., as described in connection with step 906 in FIG. 9. Determination component 1140 may be further configured to transmit, to a user equipment (UE), the selection procedure for uplink transmissions, e.g., as described in connection with step 908 in FIG. 9. Determination component 1140 may be further configured to monitor for at least one uplink transmission from the UE based on the selection procedure for uplink transmissions, e.g., as described in connection with step 910 in FIG. 9. Determination component 1140 may be further configured to receive the at least one uplink transmission from the UE based on the selection procedure for uplink transmissions, e.g., as described in connection with step 912 in FIG. 9.

The apparatus may include additional components that perform each of the blocks of the algorithm in the aforementioned flowcharts of FIGS. 4 and 9. As such, each block in the aforementioned flowcharts of FIGS. 4 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for determining a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH; means for identifying whether the transmission of unsent PUSCH data retransmissions is via a configured grant, where the information for uplink data retransmissions identifies whether the transmission of unsent PUSCH data retransmissions is via a configured grant; means for selecting a configured grant for the transmission of unsent PUSCH data retransmissions, where the configured grant is selected based on a timeline of the transmission of unsent PUSCH data retransmissions; means for transmitting, to a user equipment (UE), the selection procedure for uplink transmissions; means for monitoring for at least one uplink transmission from the UE based on the selection procedure for uplink transmissions; and means for receiving the at least one uplink transmission from the UE based on the selection procedure for uplink transmissions. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE). The method includes receiving, from a base station, a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH; implementing the selection procedure for uplink transmissions; and transmitting, to the base station, at least one uplink transmission based on the selection procedure for uplink transmissions.

Aspect 2 is the method of aspect 1, further including determining that data is unable to be retransmitted via the PUSCH, where the data that is determined unable to be retransmitted via the PUSCH corresponds to the unsent PUSCH data retransmissions; and transmitting the data that is determined unable to be retransmitted via the PUSCH via a configured grant.

Aspect 3 is the method of any of aspects 1 and 2, where the information for uplink data retransmissions identifies whether the transmission of unsent PUSCH data retransmissions is via a configured grant.

Aspect 4 is the method of any of aspects 1 to 3, where the information for uplink data retransmissions includes a configured grant for the transmission of unsent PUSCH data retransmissions, where the configured grant for the transmission of unsent PUSCH data retransmissions is based on a timeline of the transmission of unsent PUSCH data retransmissions.

Aspect 5 is the method of any of aspects 1 to 4, where the selection procedure for uplink transmissions is based on a number of unsent PUSCH data retransmissions.

Aspect 6 is the method of any of aspects 1 to 5, where the selection procedure for uplink transmissions is based on whether the number of unsent PUSCH data retransmissions is greater than an unsent retransmission threshold, or the selection procedure for uplink transmissions is based on whether a ratio of the number of unsent PUSCH data retransmissions to a number of total PUSCH data retransmissions is greater than a ratio threshold.

Aspect 7 is the method of any of aspects 1 to 6, where the selection procedure for uplink transmissions is received via radio resource control (RRC) signaling, an RRC configuration, or a medium access control (MAC) control element (MAC-CE).

Aspect 8 is the method of any of aspects 1 to 7, where the at least one uplink transmission is transmitted via at least one of a configured grant or the PUSCH.

Aspect 9 is the method of any of aspects 1 to 8, where the at least one uplink transmission includes a number of unsent PUSCH data retransmissions.

Aspect 10 is the method of any of aspects 1 to 9, where the selection procedure for uplink transmissions is based on a spatial relation or quasi co-location (QCL) information.

Aspect 11 is the method of any of aspects 1 to 10, where the selection procedure for uplink transmissions is based on unsent PUSCH resources.

Aspect 12 is the method of any of aspects 1 to 11, where the selection procedure for uplink transmissions corresponds to specification information or is preconfigured.

Aspect 13 is the method of any of aspects 1 to 12, where uplink data retransmissions correspond to uplink data that is transmitted more than once.

Aspect 14 is the method of any of aspects 1 to 13, further including determining the selection procedure for uplink transmissions, the selection procedure for uplink transmissions including information for uplink data retransmissions, where the information for uplink data retransmissions corresponds to specification information.

Aspect 15 is an apparatus for wireless communication including means for implementing a method as in any of aspects 1 to 14.

Aspect 16 is an apparatus for wireless communication including at least one processor coupled to a memory and configured to implement a method as in any of aspects 1 to 14.

Aspect 17 is a computer-readable medium storing computer executable code, where the code when executed by a processor causes the processor to implement a method as in any of aspects 1 to 14.

Aspect 18 is a method of wireless communication at a base station. The method includes determining a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH; transmitting, to a user equipment (UE), the selection procedure for uplink transmissions; and monitoring for at least one uplink transmission from the UE based on the selection procedure for uplink transmissions.

Aspect 19 is the method of aspect 18, further including identifying whether the transmission of unsent PUSCH data retransmissions is via a configured grant, where the information for uplink data retransmissions identifies whether the transmission of unsent PUSCH data retransmissions is via a configured grant.

Aspect 20 is the method of any of aspects 18 to 19, further including selecting a configured grant for the transmission of unsent PUSCH data retransmissions, where the configured grant for the transmission of unsent PUSCH data retransmissions is selected based on a timeline of the transmission of unsent PUSCH data retransmissions.

Aspect 21 is the method of any of aspects 18 to 20, where the selection procedure for uplink transmissions is based on a number of unsent PUSCH data retransmissions.

Aspect 22 is the method of any of aspects 18 to 21, where the selection procedure for uplink transmissions is based on whether the number of unsent PUSCH data retransmissions is greater than an unsent retransmission threshold.

Aspect 23 is the method of any of aspects 18 to 22, where the selection procedure for uplink transmissions is based on whether a ratio of the number of unsent PUSCH data retransmissions to a number of total PUSCH data retransmissions is greater than a ratio threshold.

Aspect 24 is the method of any of aspects 18 to 23, where the selection procedure for uplink transmissions is transmitted via radio resource control (RRC) signaling, an RRC configuration, or a medium access control (MAC) control element (MAC-CE).

Aspect 25 is the method of any of aspects 18 to 24, further including receiving the at least one uplink transmission from the UE based on the selection procedure for uplink transmissions.

Aspect 26 is the method of any of aspects 18 to 25, where the at least one uplink transmission is received via at least one of a configured grant or the PUSCH.

Aspect 27 is the method of any of aspects 18 to 26, where the at least one uplink transmission includes a number of unsent PUSCH data retransmissions.

Aspect 28 is the method of any of aspects 18 to 27, where the selection procedure for uplink transmissions is based on a spatial relation or quasi co-location (QCL) information.

Aspect 29 is the method of any of aspects 18 to 28, where the selection procedure for uplink transmissions is based on unsent PUSCH resources.

Aspect 30 is the method of any of aspects 18 to 29, where the selection procedure for uplink transmissions corresponds to specification information or is preconfigured.

Aspect 31 is the method of any of aspects 18 to 30, where uplink data retransmissions correspond to uplink data that is transmitted more than once.

Aspect 32 is an apparatus for wireless communication including means for implementing a method as in any of aspects 18 to 31.

Aspect 33 is an apparatus for wireless communication including at least one processor coupled to a memory and configured to implement a method as in any of aspects 18 to 31.

Aspect 34 is a computer-readable medium storing computer executable code, where the code when executed by a processor causes the processor to implement a method as in any of aspects 18 to 31.

What is claimed is:

1. An apparatus for wireless communication at a user equipment (UE), comprising:
    a memory; and
    at least one processor coupled to the memory and configured to:
        receive, from a base station, a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH;
        implement the selection procedure for uplink transmissions; and
        transmit, to the base station, at least one uplink transmission based on the selection procedure for uplink transmissions.

2. The apparatus of claim 1, wherein the at least one processor is further configured to:
    determine that data is unable to be retransmitted via the PUSCH, wherein the data that is determined unable to be retransmitted via the PUSCH corresponds to the unsent PUSCH data retransmissions; and
    wherein to transmit the at least one uplink transmission the at least one processor is configured to:
    transmit the data that is determined unable to be retransmitted via the PUSCH via a configured grant.

3. The apparatus of claim 1, wherein the information for uplink data retransmissions identifies whether the transmission of unsent PUSCH data retransmissions is via a configured grant.

4. The apparatus of claim 1, wherein the information for uplink data retransmissions includes a configured grant for the transmission of unsent PUSCH data retransmissions,
    wherein the configured grant for the transmission of unsent PUSCH data retransmissions is based on a timeline of the transmission of unsent PUSCH data retransmissions.

5. The apparatus of claim 1, wherein the selection procedure for uplink transmissions is based on a number of unsent PUSCH data retransmissions.

6. The apparatus of claim 5, wherein the selection procedure for uplink transmissions is based on whether the number of unsent PUSCH data retransmissions is greater than an unsent retransmission threshold, or
    wherein the selection procedure for uplink transmissions is based on whether a ratio of the number of unsent PUSCH data retransmissions to a number of total PUSCH data retransmissions is greater than a ratio threshold.

7. The apparatus of claim 1, wherein the selection procedure for uplink transmissions is received via radio resource control (RRC) signaling, an RRC configuration, or a medium access control (MAC) control element (MAC-CE).

8. The apparatus of claim 1, wherein the at least one uplink transmission is transmitted via at least one of a configured grant or the PUSCH.

9. The apparatus of claim 8, wherein the at least one uplink transmission includes a number of unsent PUSCH data retransmissions.

10. The apparatus of claim 1, wherein the selection procedure for uplink transmissions is based on a spatial relation or quasi co-location (QCL) information.

11. The apparatus of claim 1, wherein the selection procedure for uplink transmissions is based on unsent PUSCH resources.

12. The apparatus of claim 1, wherein the selection procedure for uplink transmissions corresponds to specification information or is preconfigured.

13. The apparatus of claim 1, wherein uplink data retransmissions correspond to uplink data that is transmitted more than once.

14. The apparatus of claim 1, wherein the at least one processor is further configured to:
    determine the selection procedure for uplink transmissions, the selection procedure for uplink transmissions including information for uplink data retransmissions, wherein the information for uplink data retransmissions corresponds to specification information.

15. A method of wireless communication at a user equipment (UE), comprising:
- receiving, from a base station, a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH;
- implementing the selection procedure for uplink transmissions; and
- transmitting, to the base station, at least one uplink transmission based on the selection procedure for uplink transmissions.

16. An apparatus for wireless communication at a base station, comprising:
- a memory; and
- at least one processor coupled to the memory and configured to:
  - determine a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH;
  - transmit, to a user equipment (UE), the selection procedure for uplink transmissions; and
  - monitor for at least one uplink transmission from the UE based on the selection procedure for uplink transmissions.

17. The apparatus of claim 16, wherein the at least one processor is further configured to:
- identify whether the transmission of unsent PUSCH data retransmissions is via a configured grant, wherein the information for uplink data retransmissions identifies whether the transmission of unsent PUSCH data retransmissions is via a configured grant.

18. The apparatus of claim 16, wherein the at least one processor is further configured to:
- select a configured grant for the transmission of unsent PUSCH data retransmissions, wherein the configured grant for the transmission of unsent PUSCH data retransmissions is selected based on a timeline of the transmission of unsent PUSCH data retransmissions.

19. The apparatus of claim 16, wherein the selection procedure for uplink transmissions is based on a number of unsent PUSCH data retransmissions.

20. The apparatus of claim 19, wherein the selection procedure for uplink transmissions is based on whether the number of unsent PUSCH data retransmissions is greater than an unsent retransmission threshold.

21. The apparatus of claim 19, wherein the selection procedure for uplink transmissions is based on whether a ratio of the number of unsent PUSCH data retransmissions to a number of total PUSCH data retransmissions is greater than a ratio threshold.

22. The apparatus of claim 16, wherein the selection procedure for uplink transmissions is transmitted via radio resource control (RRC) signaling, an RRC configuration, or a medium access control (MAC) control element (MAC-CE).

23. The apparatus of claim 16, wherein the at least one processor is further configured to:
- receive the at least one uplink transmission from the UE based on the selection procedure for uplink transmissions.

24. The apparatus of claim 23, wherein the at least one uplink transmission is received via at least one of a configured grant or the PUSCH.

25. The apparatus of claim 24, wherein the at least one uplink transmission includes a number of unsent PUSCH data retransmissions.

26. The apparatus of claim 16, wherein the selection procedure for uplink transmissions is based on a spatial relation or quasi co-location (QCL) information.

27. The apparatus of claim 16, wherein the selection procedure for uplink transmissions is based on unsent PUSCH resources.

28. The apparatus of claim 16, wherein the selection procedure for uplink transmissions corresponds to specification information or is preconfigured.

29. The apparatus of claim 16, wherein uplink data retransmissions correspond to uplink data that is transmitted more than once.

30. A method of wireless communication at a base station, comprising:
- determining a selection procedure for uplink transmissions, the selection procedure including information for uplink data retransmissions, the information for uplink data retransmissions being associated with a transmission of unsent physical uplink shared channel (PUSCH) data retransmissions, the unsent PUSCH data retransmissions corresponding to data that is transmitted via a configured grant when the data is unable to be retransmitted via a PUSCH;
- transmitting, to a user equipment (UE), the selection procedure for uplink transmissions; and
- monitoring for at least one uplink transmission from the UE based on the selection procedure for uplink transmissions.

* * * * *